United States Patent [19]

v.d.Osten-Sacken et al.

[11] Patent Number: 4,969,375
[45] Date of Patent: Nov. 13, 1990

[54] PEDAL BINDING

[75] Inventors: Ernst v.d.Osten-Sacken, Roetgen, Fed. Rep. of Germany; Klaus Schuchard, Ponts et Marais, France

[73] Assignee: Fichtel & Sachs AG, Schweinfurt, Fed. Rep. of Germany

[21] Appl. No.: 375,817

[22] Filed: Jul. 5, 1989

[30] Foreign Application Priority Data

Jul. 5, 1988 [DE] Fed. Rep. of Germany ....... 3822663

[51] Int. Cl.$^5$ .............................................. G05G 1/14
[52] U.S. Cl. .................................. 74/594.6; 74/594.4; 36/131
[58] Field of Search ........................... 74/594.1–594.6; 36/131, 132

[56] References Cited

U.S. PATENT DOCUMENTS

| 4,538,480 | 9/1985 | Trindle | 74/594.5 |
| 4,738,158 | 4/1988 | Christol | 74/594.6 |
| 4,762,019 | 8/1988 | Beyl | 74/594.4 |

FOREIGN PATENT DOCUMENTS

| 0146454 | 6/1985 | European Pat. Off. | 74/594.6 |
| 0155114 | 9/1985 | European Pat. Off. | 74/594.6 |
| 875354 | 9/1942 | France | 74/594.6 |
| 205395 | 9/1939 | Switzerland | 74/594.6 |
| 16829 | of 1909 | United Kingdom | 74/594.6 |
| 703040 | 1/1954 | United Kingdom | 74/594.6 |

Primary Examiner—Vinh T. Luong
Attorney, Agent, or Firm—Toren, McGeady & Associates

[57] ABSTRACT

The pedal binding makes it possible separably to couple a shoe to a bicycle pedal rotatable about a pedal spindle and comprises a pedal side coupling part which forms a tread area and, adapted to be fitted onto the tread area, a shoe side coupling part. The coupling parts are separably locked together via catch members disposed on mutually facing surfaces of bifurcated arms of the pedal side coupling part on the one hand and bifurcated arms of the shoe side coupling part on the other. Such a snap-action connection is simple and operationally reliable. Mutually associated pairs of sloping thrust faces on the coupling parts assist the separation of the locked joint upon relative tilting movements of the two coupling parts.

9 Claims, 4 Drawing Sheets

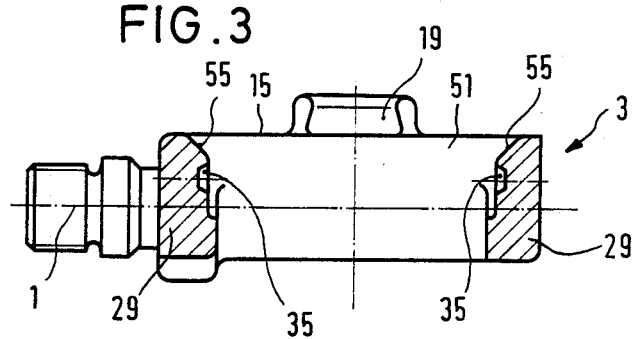
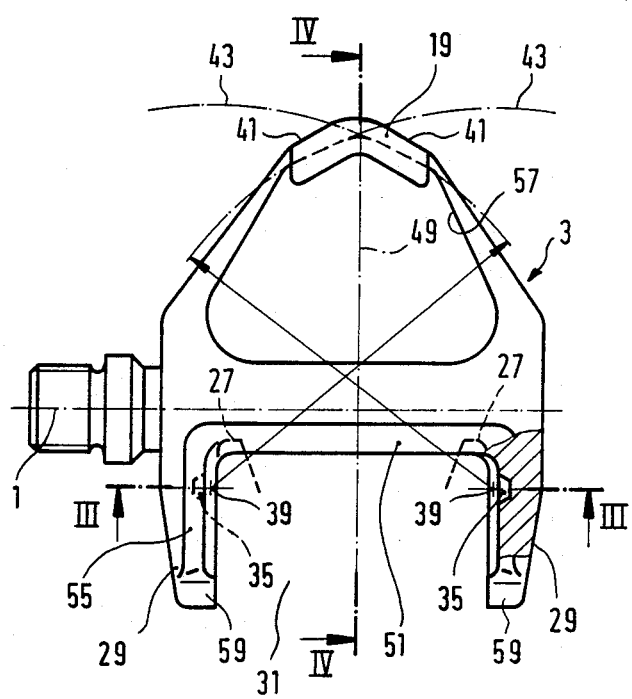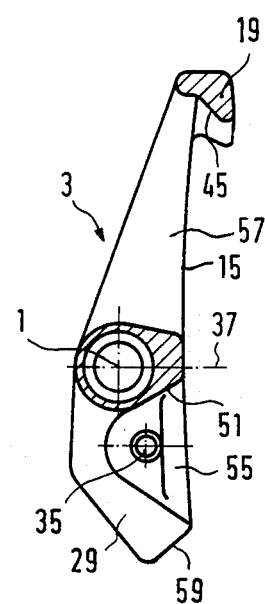

PEDAL BINDING

FIELD OF THE INVENTION

The invention relates to a pedal binding for the separable coupling of a shoe with a bicycle pedal which is rotatable about a pedal spindle.

For improved performance on sports and racing bicycles, the rider's shoe must be maintained rigidly on the pedal by a pedal binding so that not only pressure forces but also traction forces can be transmitted to the pedal. Conventional pedal bindings which are subjected to push-and-pull stresses have a bracket rigidly connected to the pedal, under which the toe of the rider's shoe engages, and a strap which extends substantially over the instep. The strap is comparatively taut as it passes around the shoe, so that in the event of a fall, the foot cannot be removed from the binding quickly enough and the rider is in many cases seriously injured in a fall.

European Patent Application No. 155 114 discloses a pedal binding having two inter-engageable coupling parts which can transmit not only pressure forces but also, within specific limits, traction forces. By twisting, tilting or excessive pulling on the part of the coupling which is on the shoe side, in relation to that part of the coupling which is on the pedal side, the parts of the coupling can be separated from each other. A binding of this type reduces the risk of a fall occurring while the foot is held fast on the pedal.

In the case of the pedal binding known from European Patent Application 155 114, the pedal which forms the tread area is provided with, extending in the direction of the pedal spindle, a bolt part which carries spring loaded catch studs on its oppositely disposed end faces, in the direction of the pedal spindle. Provided in the sole of the shoe or in a coupling part which is connected to the shoe there is a matching recess which is engaged by the bolt part when the shoe is placed on the pedal. Provided in the oppositely disposed lateral faces of the recess, in the direction of the pedal spindle, there are apertures into which the catch studs engage when the shoe is placed on the pedal, locking the shoe in position on the pedal. The recess widens out in a funnel shape towards the toe of the shoe to facilitate insertion of the bolt part into the recess.

In the case of the pedal binding known from European Patent Application 155 114, the catch studs on the bolt part which is on the pedal side are guided in bores in the bolt part and are pretensioned outwardly by thrust springs. Such a construction is comparatively complicated and susceptible to faults, since the sliding guides of the bolt studs can seize in the bores, as a consequence of dirt, for instance. However, in any case, slackening or tightening up the bolt studs will in any case alter the release properties of the pedal binding, which is not desirable.

A further pedal binding consisting of two coupling parts is known from European Pat. No. 146 454. Where this pedal binding is concerned, there are on the pedal side coupling part, in front of and behind the pedal spindle in the direction of travel, hooks which engage over associated tabs on the shoe side coupling part. The (in the direction of travel) rear hook is tensioned by a spring in the direction of travel so that it is urged towards the shoe side coupling part. It is true that such a pedal binding allows the transmission of traction forces and releases the shoe if it is rotated about the axis of the shin bone, but the shoe is not released if the foot is tilted about its longitudinal axis.

The object of the invention is to provide a simple and operationally reliable pedal binding, the coupling parts of which can be separated from each other if the catch means joining them should be over-stressed by virtually any traction or rotary movements.

SUMMARY OF THE INVENTION

The pedal binding according to the invention is of the type known from European Patent Application No. 155 114 and, like that pedal binding, comprises a pedal side coupling part which forms a tread area and a shoe side coupling part which can be placed on the tread area. A first of the two coupling parts comprises, open transversely to the tread area, a recess provided with catch members on two lateral surfaces which are opposite in the direction of the pedal spindle. A second of the two coupling parts comprises, adapted to be inserted into the recess, a bolt part carrying matching catch members which are adapted to be elastically engaged on the catch members on the first coupling part. A substantial simplification of and increase in operational reliability of the pedal binding is achieved if, according to the invention, one of the two coupling parts has, adapted to project freely and bifurcatedly transversely of the pedal spindle and elastically deflectable in the direction of the pedal spindle, bifurcated arms which carry the catch members in the region of their free ends. The bifurcated arms are thus not only utilised to support and guide the catch means but by virtue of their inherent elasticity, provide for clearly defined spring properties which do not alter in use, even when the components are dirty.

In a preferred development of the invention, both coupling parts comprise bifurcated arms which project freely and bifurcatedly transversely of the pedal spindle and of which the bifurcated arms of a first coupling part define a recess into which the bifurcated arms of the second coupling part project, in the opposite direction. Regardless of which of the two coupling parts is provided on the pedal side, therefore, there is also on the pedal a recess which is continuously open in the direction of tread, so that the risk of dirt clogging the inter-engaging catch means is reduced. This is particularly valid when the bifurcated arms on the shoe side coupling part engage between the bifurcated arms on the pedal side coupling part.

The initial forces required to break the connection provided by the catch means are determined not only by the spring properties of the flexible bifurcated arms, but also by the shape of the matching catch members. In a suitable construction, spherically shaped catch means on one coupling part are associated with conical recesses in the other coupling part. The catch-type joint must certainly be capable of meeting various requirements. On the one hand, it must be able to transmit sufficiently high traction forces while on the other it must still be sufficiently freely moving that in the event of danger, more or less any movement of rotation or the foot can break the coupling. In a preferred development, therefore, it is envisaged that when the catch members on the two coupling parts are inter-engaged, they comprise adjacently disposed oblique thrust faces which release the catch members in the event of a relative rotation of the two coupling parts about an axis of relative rotation which extends transversely to the axis of rotation of the pedal. This has the advantage that the relative rotary movement of the two coupling parts which results in the catch-type connection being broken is assisted by a thrust movement brought about by the oblique thrust surfaces and that in the event of danger the release process is facilitated.

For optimum transmission of traction forces, it has been found appropriate for the two coupling parts to be connected to each other both in front of the pedal spindle and also behind the pedal spindle, in the direction of travel. In a preferred development, the catch means are disposed behind the pedal spindle in the direction of travel, while there is in front of the pedal spindle, in the direction of travel and on the pedal side coupling part, a hook which is open against the direction of travel and which engages over a tab projecting from the shoe side coupling part, in the direction of the hook. The said oblique thrust surfaces are expediently provided on the hook and on the tab and in the event of a relative rotation, they displace the coupling parts relatively to each other in the direction of travel. The oblique surfaces on the hook and on the tab also facilitate the release of the hook-tab connection in the event of danger.

In addition or as an alternative to the oblique thrust faces on the hook-tab connection, it is also possible to provide further pairs of oblique thrust faces in the region of the recess which accommodates the bolt part. In an expedient further development in which the pedal side coupling part comprises bifurcated arms which project freely and bifurcatedly transversely of the pedal spindle and against the direction of travel and which accommodate between them bifurcated arms on the shoe side coupling part which project freely and transversely to the pedal spindle in the direction of travel, the oblique thrust faces can be provided between the bifurcated arms of the pedal side coupling part and on the ends of the bifurcated arms of the shoe side coupling part. In the event of a relative rotation of the coupling parts about an axis of relative rotation of the coupling parts about an axis of relative rotation extending transversely to the tread area, the shoe side coupling part is forced upwards so facilitating the process of releasing the catch-type connection.

As far as possible, the aforementioned hook-tab connection ought not adversely to affect the release of the catch-type connection if the shoe side coupling part is rotated about the shin bone axis. In a preferred development, therefore, it is envisaged that the hook, when viewed in the direction of the tread area, should be of an angled shape, the arms extending substantially tangentially of the arcs of rotation of the tab, through pivot axes defined by the catch members. The angled shape of the hook facilitates closure of the connection since it moves the tab on the shoe side coupling part into a central position in relation to the pedal side coupling part. Insertion of the tab under the hook is substantially facilitated if the pedal side coupling part comprises in the region of the hook an aperture which is suitable for receiving the tab. It is convenient if the aperture is wedge-shaped towards the hook, guiding the tab positively into place under the hook.

The recess in the first coupling part which accommodates the catch element of the second coupling part expediently comprises, extending substantially along its entire edge, sloping insertion faces which widen the recess out towards the second coupling part. These sloping surfaces facilitate centring of the coupling parts in relation to each other when the catch-type connection is closed. If both coupling parts are provided with bifurcated arms which are directed towards one another, the ends of the bifurcated arms can likewise be provided with matching oblique surfaces which extend upwardly and obliquely in the direction of travel, preventing the bifurcated arms becoming unintentionally interlocked.

The bifurcated arms which produce the springing action of the catch members can be formed in one piece on the coupling part. However, in a preferred development, they are formed in one piece on a web portion of a substantially U-shaped catch element which, in the region of the web portion, is supported on a base part of the coupling part. The base part and the coupling part can thus consist of different materials, fibre reinforced synthetics plastics materials having been found to be particularly suitable, particularly for the catch element and furthermore, the catch element can be interchanged, for instance to alter its spring hardness.

The spring force of the catch element determines the traction loading capacity of the pedal binding and is expediently adjustable so that it can be adapted to the appropriate usage situation. The spring force can be easily altered without having to remove the catch element from the base part when the web portion of the catch element is mounted on the base part by means of two joints and in the region of those ends of the bifurcated arms which are adjacent to the web portion, and if there is between the two joints an abutment adjustable in the direction of the bifurcated arms and through which the web portion is supported on the base part. By adjusting the abutment, the angular position of the bifurcated arms in relation to each other can be adjusted, as can also their spring travel. Where the abutment is concerned this may, for example, be a setscrew which is screwed into the web portion or into the base part. A stepwise simple adjustment is provided by a stepped eccentric plate rotatably mounted on the base part and serving as an abutment.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 2 is a partly broken away plan view of a pedal side first coupling part of the pedal binding in FIG. 1;

FIG. 3 is a sectional view through the first coupling part viewed on a line III—III in FIG. 2;

FIG. 4 is a sectional view through the first coupling part viewed on a line IV—IV in FIG. 2 and concordant with the sectional plane in FIG. 1;

DESCRIPTION OF PREFERRED EMBODIMENTS

Figure 1:
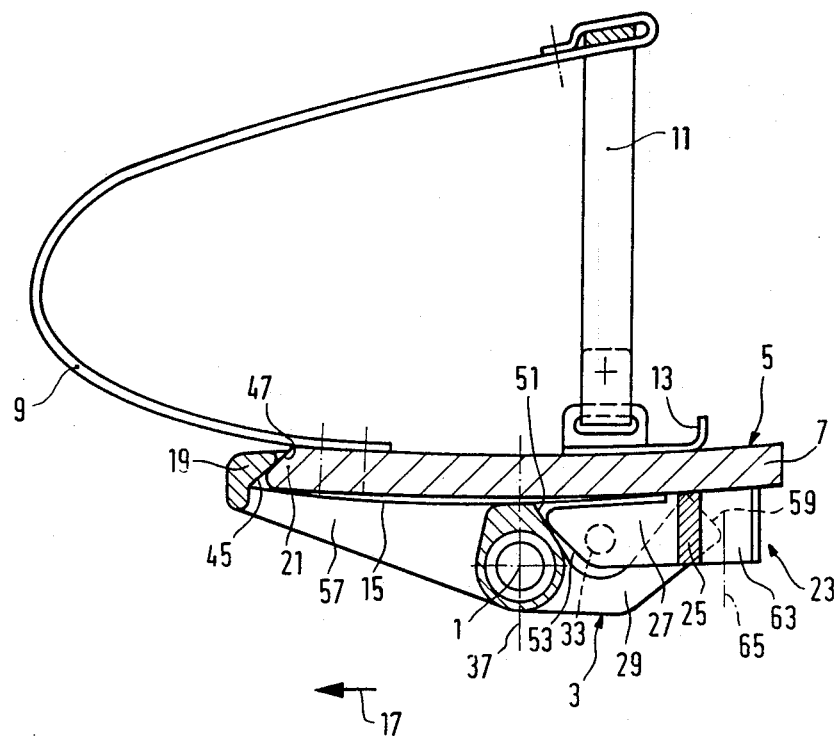
FIG. 1 shows, extending at a right angle to the pedal spindle, a longitudinal section through a pedal binding of a bicycle.
Figure 5:
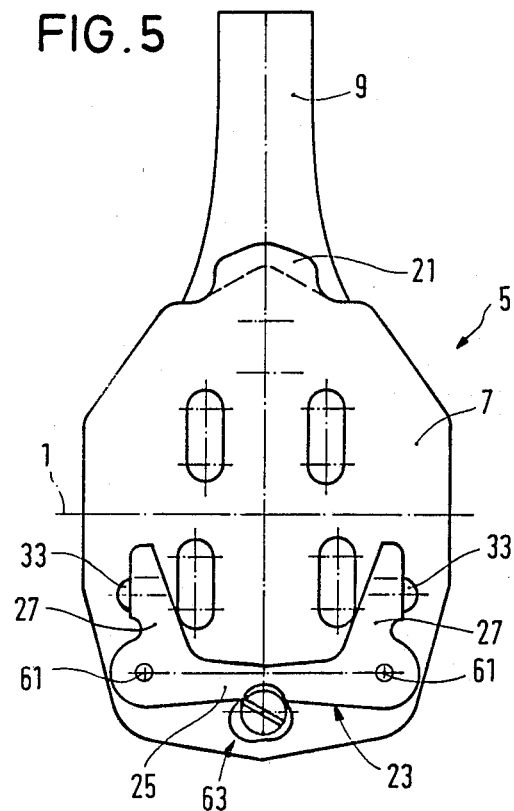
FIG. 5 is a view from below of a shoe side second coupling part of the pedal binding in FIG. 1.

The cycle pedal binding shown in a composite view in FIG. 1 and in its component parts in FIGS. 2 to 5 comprises a pedal side first coupling part 3 rotatable about a pedal spindle 1 and on which, in a manner to be described in greater detail hereinafter, there is a separably engaged shoe side second coupling part 5. The coupling part 5 carries on a base plate 7 a conventional foot hook 9 which engages over the toe of the shoe and which, together with a strap 11 and a web 13 extending parallel with the pedal spindle 1, fixes the shoe in relation to the base part 7 in a conventional manner.

On its upper side, the pedal side coupling part 3 forms a tread area 15 on which rests the base part 7 for the transmission of compression or thrust forces. On the side of the pedal spindle 1 which is in front in the direction of travel as indicated by an arrow 17, the pedal side coupling part 3 is provided with, open against the direction of travel, a hook 19 which engages over a tab 21 integrally moulded on the front end of the base part 7. In the direction of travel, there is behind the pedal spindle 1, on the base part 7 of the shoe side coupling part 5, a substantially U-shaped catch element 23 which consists of a web portion 25 extending in the direction of the pedal spindle and two bifurcated arms 27 projecting freely from the end zones of the web portion 25 in the direction of travel. The bifurcated arms 27 of the catch element 23 engage between two bifurcated arms 29 which bifurcatedly project freely from the pedal side coupling part 3 against the direction of travel and which form between them a recess 31 to accommodate the catch element 23.

The bifurcated arms 27 of the catch elements 23 are resiliently deflectable in the direction of the pedal spindle 1 and carry in the region of their ends, on the side faces which point towards the bifurcated arms 27, spherically shaped catch members 33 which engage matching catch members 35 in the form of conical recesses in the mutually facing side faces of the bifurcated arms 29. The spring force of the bifurcated arms 27 is sufficiently great that via the catch members 33, 35 and the hook-tab connection 19, 21, the traction forces occurring while the bicycle is being ridden can be transmitted. If the traction forces exceed the retaining force of the catch-type connection 33, 35, then the shoe side coupling part 5 becomes detached from the pedal side coupling part 3.

The snap-action connection between the shoe side coupling part 5 and the pedal side coupling part 3 can be undone not only by excessive traction forces but by virtually any rotary or tilting movement of the shoe and thus of the shoe side coupling part 5 in relation to the pedal side coupling part 3. In the event of the coupling part 5 rotating about a high axis, for example the axis 37 extending transversely to the tread surface 15, then normally only one of the two catchtype connections 33, 35 will become detached and the shoe side coupling part 5 will pivot about a pivot axis 39 (FIG. 2) defined by the central point of the ball of the catch member 33. The hook 19 is constructed as an angled hook symmetrical with the longitudinal central plane through the pedal side coupling part 3, its angled arms 41 extending substantially tangentially of the arcs of rotation shown at 43 and relating to the tab 21 of the coupling part 3 which pivots about the axes of rotation 39. The hook 19 does not impede the pivoting movement of the coupling part 5 along the tread surface 15.

The hook 19 and the tab 21 have, extending obliquely upwardly in the direction of travel 17, matching oblique thrust faces 45, 47. The faces 45, 47 extend at the same angle to the tread area 15 and bear on each other when the snap-action connection is closed. Upon a tilting movement of the coupling part 5 about a longitudinal axis of the shoe extending in the direction of travel and as indicated at 49 in FIG. 2, the oblique thrust surfaces 45, 47 assist the loosening movement of the snap-action connection 33, 35 in that they push the coupling part 5 relatively to the coupling part 3 and against the direction of travel. Similar considerations apply to a tilting movement about an axis parallel with the pedal spindle 1, by which the tab 21 is lifted forwards by an excessive application of force under the book 19. In this case, too, the sloping thrust faces 45, 47 bring about a movement which opens the joint.

A further pairing of oblique thrust surfaces which assist the opening movement consist of a sloping thrust face 51 extending obliquely upwardly in the direction of travel 17, between the two bifurcated arms 29 of the coupling part 3 on the one hand and the free ends of the bifurcated arms 27 which are constructed as oblique surfaces 53, on the other. When the snap-action connection 33, 35 is closed, the bifurcated arms 27 are closely adjacent the sloping thrust face 51 or may even be bearing on it so that upon a pivoting movement of the coupling part 5 about the pivot axes 39, they will, at least in one direction of rotation, assist the movement of releasing the connection by lifting the bifurcated arm 27 out of the recess 31. In any case, however, the sloping surfaces 51, 53 assist the separating movement and counteract any inter-engagement of the coupling parts 3, 5. The oblique thrust faces 45, 47 and 51, 53 provide for a clearly defined release of the pedal binding during tilting and pivoting movements of the coupling parts 3, 5 about virtually any spatial axes.

In addition to the oblique thrust face 51 which connects the bifurcated arms 29, oblique faces 55 are also moulded on the mutually facing sides of the bifurcated arms 29 and together with the oblique thrust face 51 they widen out upwardly in a funnel-shape to the tread area 15 and facilitate insertion of the catch means 33 into the recesses or catch members 35. In the area between the pedal spindle 1 and the hook 19 there is an aperture 57 which tapers triangularly towards the hook 19 and into which, when the pedal binding is closed, the base part 7 with the tab 21 in front can fit, until by a combined thrusting and tilting movement of the coupling part 5, the tab 21 fits under the hook 19. The angular shape of the hook 19 provides for centering of the tab 21 and the oblique surfaces 51, 55 provide for centering of the catch member 33 in relation to the catch members 35 during subsequent depression of that portion of the coupling part 5 which is at the rear in the direction of travel.

Formed on the end faces of the bifurcated arms 29 and matching the oblique faces 53 there are oblique faces 59 which extend at substantially the same angle to the tread area 15 as the oblique faces 53 of the bifurcated arms 27, extending obliquely upwardly in the direction of travel 17. When the coupling part 5 is placed on the coupling part 3, the oblique faces 53, 59 prevent the former becoming inextricably locked with the latter.

In order to be able to adjust the traction force threshold needed to release the connections 33, 35, the web portion 25 of the catch element 23 is connected to the base part 7 by two joints 61 in the region of the ends of the web arms 27 which face it. On that side of the web portion 25 which is remote from the bifurcated arms 27, there is rotatably mounted on the base part 7 a stepped eccentric plate 63 which rotates about an axis 65. The stepped eccentric plate 63 forms for the flexible web portion 25 between the joints 61 an abutment which can be adjusted in stages. By varying the height of the abutment, it is possible to vary the distance between the catch members 33 in the direction of the spindle 1 and thus the snap-action force created when the connection is closed. It will be appreciated that instead of the stepped eccentric plate, also other adjustable abutments may be provided, for instance in the form of setscrews or the like. Also, the adjustable part of the abutment can be provided on the web portion 25 and may be braced on a fixed counter-abutment on the base part 7.

Alternative embodiments of the pedal binding will be explained hereinafter. Parts which have the same function are here identified by the same reference numerals as for FIGS. 1 to 5, followed by a letter to assist differentiation. To explain the construction and mode of operation, attention is drawn to the description of FIGS. 1 to 5.

Figure 6:
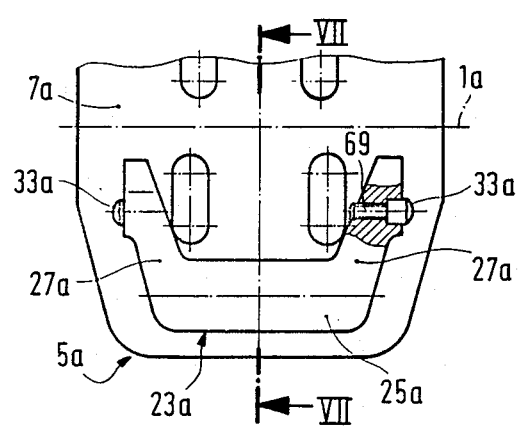
FIG. 6 is a partial view from below of an alternative shoe side second coupling part for use in a pedal binding according to FIG. 1.
Figure 7:
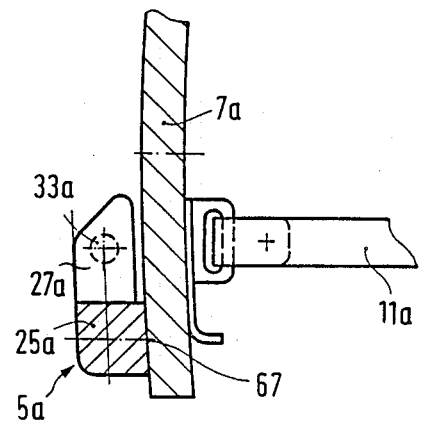
FIG. 7 is a sectional view through the second coupling part viewed on a line VII—VII in FIG. 6, and FIGS. 8 and 9 show diagrammatic views of alternative form of the pedal binding in FIG. 1.

FIGS. 6 and 7 show an alternative embodiment of shoe side coupling part 5a, which differs from the coupling part 5 only by the form of its catch element 23a. The construction of the pedal side coupling part and the guidance and snap-action connection of the coupling part 5a to the pedal side coupling part corresponds to the example of embodiment illustrated in FIGS. 1 to 5. Once again, the catch element 23a is substantially U-shaped and has, projecting freely in the direction of travel from a web portion 25a, bifurcated arms 27a which in the region of their free ends carry ball-shaped catch members 33a. In contrast to the embodiment shown in FIGS. 1 to 5, the web portion 23a however is rigidly fixed to the base part 7a. The fixing can be inseparable, for example by adhesion, or it may be separable, for example by screws indicated at 67 so that the catch element can if necessary be exchanged. The adjustment of the force required for the snap-action joint is carried out by adjusting the catch members 33a in the direction of the pedal spindle 1a. For this purpose, the catch members 33a are provided with a screwthreaded shank 69 which holds them adjustably in the bifurcated arms 27a.

Figure 8:
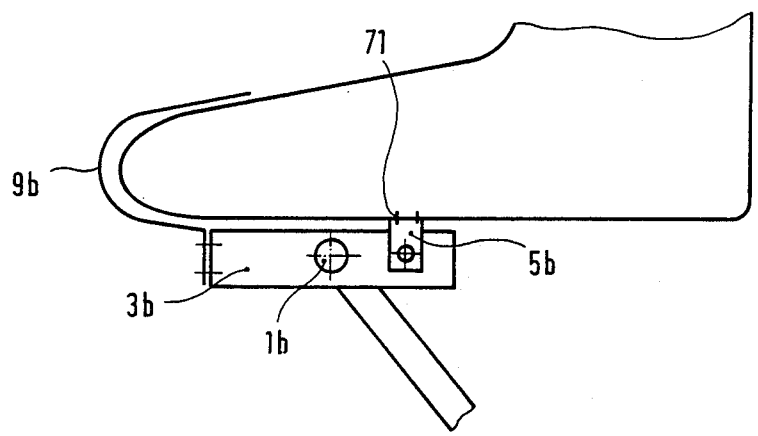

In the examples of embodiment shown in FIGS. 1 to 7, the loop 9 is attached to the shoe side coupling part 5. FIG. 8 shows an alternative embodiment in which a loop 9b engaging around the toe of the shoe is attached directly to the pedal side coupling part 3b which is rotatable about the pedal spindle 1b. The shoe side coupling part 5b which comprises at least one catch element similar to the catch element 23 or 23a is attached directly to the shoe by connecting elements 71, for example by screws, rivets, gluing or welding.

Figure 9:
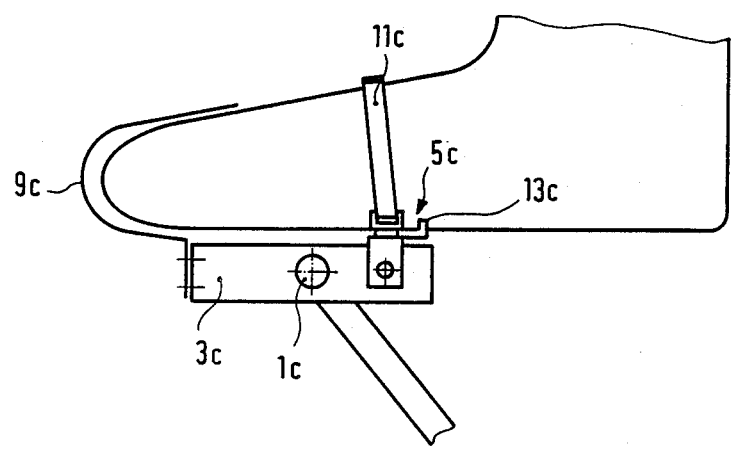

FIG. 9b shows an alternative embodiment in which a loop 9c is again attached directly to the pedal side coupling part 3c which is rotatable about the pedal spindle 1c, while, similarly to FIG. 1, the shoe side coupling part 5c comprises a strap 11e and a catch web 13c. The shoe side coupling part 5c comprises at least the elements 7 and 23 or 7a and 23a of the examples of embodiment shown in FIGS. 1 to 7. The shoe side coupling part 5c is in this alternative embodiment held on the shoe solely by the strap 11c. The pedal side coupling part 3c, like the coupling part 3b, can also be used without the shoe side coupling part 5c or 5b.

If necessary, additional pedal adaptors can be provided to make the pedal side coupling parts more tread-secure.

While specific embodiments of the invention have been shown and described in detail to illustrate the application of the inventive principles, it will be understood that the invention may be embodied otherwise without departing from such principles.

What we claim is:

1. A pedal binding for separably coupling a shoe with a bicycle pedal rotatable about a pedal spindle and having a direction of travel and said pedal binding having one coupling part (3) to be arranged on the pedal side, forming a tread area (15), and another coupling part (5) to be arranged on the shoe side and adapted to be fitted onto the tread area (15), a first (3) of the two coupling parts (3, 5) having, open transversely of the tread area (15), a recess (31) provided with catch members (35) on two side faces located opposite each other in the direction of the pedal spindle (1), a second (5) of the two coupling parts (3, 5) comprising a bolt part (23) adapted to be inserted into the recess (31) and including catch members (33) complementary with and elastically lockable in the catch members (35) on the first coupling part (3), wherein one (3) of the two coupling parts (3, 5) comprises, adapted to project freely and bifurcatedly transversely of the pedal spindle (1), and elastically deflectable in the direction of the pedal spindle (1), bifurcated arms carrying the catch members (33) in the region of free ends of the bifurcated arms, each of the coupling parts (3, 5) comprise bifurcated arms (27, 29) projecting freely and bifurcatedly transversely of the pedal spindle (1), the bifurcated arms (29) of the first coupling part (3) project in the opposite direction to the bifurcated arms (27) of the second coupling part (5) and define therebetween the recess (31) and accommodating therebetween the bifurcated arms (27) of the second coupling part (5).

2. A pedal binding according to claim 1, wherein the first coupling part (3) is disposed on the pedal side and the bifurcated arms (29) thereof project opposite to the direction of travel (17).

3. A pedal binding for separably coupling a shoe with a bicycle pedal rotatable about a pedal spindle and having a direction of travel and said pedal binding having one coupling part (3) to be arranged on the pedal side, forming a tread area (15), and another coupling part (5) to be arranged on the shoe side and adapted to be fitted onto the tread area (15), a first (3) of the two coupling parts (3, 5) having, open transversely of the tread area (15), a recess (31) provided with catch members (35) on two side faces located opposite each other in the direction of the pedal spindle (1), a second (5) of the two coupling parts (3, 5) comprising a bolt part (23) adapted to be inserted into the recess (31) and including catch members (33) complementary with and elastically lockable in the catch members (35) on the first coupling part (3), wherein one (3) of the two coupling parts (3, 5) comprises, adapted to project freely and bifurcatedly transversely of the pedal spindle (1), and elastically deflectable in the direction of the pedal spindle (1), bifurcated arms carrying the catch members (33) in the region of free ends of the bifurcated arms, each of the two coupling parts (3, 5) are integally provided with oblique thrust faces (45, 47; 51, 53) and, when the catch members (33, 35) are interengaged, are mutually adjacent and release the engagement of the catch members (33, 35) upon a relative rotation of the two coupling parts (3, 5) about an axis of relative rotation which extends crosswise to the axis of rotation of the pedal.

4. A pedal binding according to claim 3, wherein the catch members (33, 35) are arranged to follow the pedal spindle (1) in the direction of travel (17) and wherein the pedal side coupling part (3) is arranged to carry in front of the pedal spindle (1) in the direction of travel (17) a hook (19) open opposite to the direction of travel (17) and engages over a tab (21) projecting towards the hook (19) from the shoe side coupling part (5) and wherein the oblique thrust surfaces (45, 47) are integral with the hook (19) and the tab (21) and displace the coupling parts (3, 5) in the direction of travel (17) upon rotation of the coupling parts relative to one another.

5. A pedal binding according to claim 3, wherein the pedal side coupling part (3) comprises bifurcated arms (29) arranged to project freely and bifurcatedly transversely of the pedal spindle (1) opposite to the direction of travel (17) and accommodate therebetween bifurcated arms (27) on the shoe side coupling part (5) arranged to project freely in the direction of travel and transversely to the pedal spindle (1), the mutually complementary catch members (33, 35) are located between adjacent bifurcated arms (27, 29) of said shoe side and pedal side and wherein the oblique thrust faces (51, 53) are located between the bifurcated arms (29) of the pedal side coupling part (3) and on the ends of the bifurcated arms (27) of the shoe side coupling part (5).

6. A pedal binding for separably coupling a shoe with a bicycle pedal rotatable about a pedal spindle and having a direction of travel and said pedal binding having one coupling part (3) to be arranged on the pedal side, forming a tread area (15), and another coupling part (5) to be arranged on the shoe side and adapted to be fitted onto the tread area (15), a first (3) of the two coupling parts (3, 5) having, open transversely of the tread area (15), a recess (31) provided with catch members (35) on two side faces located opposite each other in the direction of the pedal spindle (1), a second (5) of the two coupling parts (3, 5) comprising a bolt part (23) adapted to be inserted into the recess (31) and including catch members (33) complementary with and elastically lockable in the catch members (35) on the first coupling part (3), wherein one (3) of the two coupling parts (3, 5) comprises, adapted to project freely and bifurcatedly transversely of the pedal spindle (1), and elastically deflectable in the direction of the pedal spindle (1), bifurcated arms carrying the catch members (33) in the region of free ends of the bifurcated arms, the pedal side coupling part (3) has bifurcated arms (29) arranged to project bifurcatedly and freely opposite to the direction of travel, and accommodating therebetween bifurcated arms (27) of the shoe side coupling part (3) arranged to project freely transversely to the pedal spindle (1) in the direction of travel, the mutually complementary catch members (33, 35) being formed between adjacent bifurcated arms (27, 29) of said pedal side and shoe side coupling parts (3, 5) and wherein there are formed on the free ends of the bifurcated arms (27, 29) of the coupling parts (3, 5), mutually complementary oblique surfaces (53, 39) which extend obliquely upwardly in the direction of travel.

7. A pedal binding for separably coupling a shoe with a bicycle pedal rotatable about a pedal spindle and having a direction of travel and said pedal binding having one coupling part (3) to be arranged on the pedal side, forming a tread area (15), and another coupling part (5) to be arranged on the shoe side and adapted to be fitted onto the tread area (15), a first (3) of the two coupling parts (3, 5) having, open transversely of the tread area (15), a recess (31) provided with catch members (35) on two side faces located opposite each other in the direction of the pedal spindle (1), a second (5) of the two coupling parts (3, 5) comprising a bolt part (23) adapted to be inserted into the recess (31) and including catch members (33) complementary with and elastically lockable in the catch members (35) on the first coupling part (3), wherein one (3) of the two coupling parts (3, 5) comprises, adapted to project freely and bifurcatedly transversely of the pedal spindle (1), and elastically deflectable in the direction of the pedal spindle (1), bifurcated arms carrying the catch members (33) in the region of free ends of the bifurcated arms, the two bifurcated arms (27) adapted to be elastically deflected to the direction of the pedal spindle (1) and carrying the catch members (33) in the region of the free ends thereof are formed in one piece on a web portion (25) of a substantially U-shaped catch element (23) and in the region of the web portion (25) is supported on a base part (7) of the first coupling part (5).

8. A pedal binding according to claim 7, wherein in the region of the ends of the bifurcated arms (27) adapted to be elastically deflected close to it, the web portion (25) is mounted on the base part (7) by two joints (61) and wherein between the two joints (61) there is, adjustable in the direction of the bifurcated arms (27) adapted to be elastically deflected an abutment (63) supporting the web portion (25) on the base part (7).

9. A pedal binding according to claim 8, wherein the abutment is constructed as a stepped centering plata (63) rotatably mounted on the base part (7).

* * * * *